(12) United States Patent
Liang et al.

(10) Patent No.: US 9,077,811 B2
(45) Date of Patent: Jul. 7, 2015

(54) METHOD AND APPARATUS FOR ENABLING INTEROPERABILITY OF TOUCH DEVICES

(71) Applicant: ADOBE SYSTEMS, INC., San Jose, CA (US)

(72) Inventors: Mao Liang, Beijing (CN); Lei Zhao, Beijing (CN); Gang Cai, Beijing (CN); Jin Huang, Beijing (CN); Ning Li, Beijing (CN); Mingjun Zhang, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 269 days.

(21) Appl. No.: 13/679,461

(22) Filed: Nov. 16, 2012

(65) Prior Publication Data

US 2014/0143363 A1 May 22, 2014

(51) Int. Cl.
*G06F 15/16* (2006.01)
*H04M 1/725* (2006.01)
*G06F 3/038* (2013.01)
*H04W 84/20* (2009.01)

(52) U.S. Cl.
CPC ............ *H04M 1/7253* (2013.01); *H04W 84/20* (2013.01); *G06F 3/038* (2013.01); *G06F 2203/0382* (2013.01)

(58) Field of Classification Search
CPC ...... H04N 5/262; G11B 27/34; G11B 27/034; G06F 9/4443; G06F 3/01; H04L 67/02; H04L 67/14; H04W 84/20; H04M 1/00
See application file for complete search history.

(56) References Cited

U.S. PATENT DOCUMENTS

| | | | |
|---|---|---|---|
| 7,490,125 B1 * | 2/2009 | Jagadeesan et al. | 709/204 |
| 7,509,249 B2 | 3/2009 | Britt et al. | |
| 8,156,547 B2 | 4/2012 | Rao et al. | |
| 2011/0164058 A1 | 7/2011 | Lemay | |
| 2011/0252318 A1 | 10/2011 | Helms | |
| 2012/0096076 A1 | 4/2012 | Chan | |
| 2013/0205208 A1 * | 8/2013 | Kim et al. | 715/716 |

FOREIGN PATENT DOCUMENTS

WO    WO 00/50979    8/2000

* cited by examiner

*Primary Examiner* — Wing F Chan
*Assistant Examiner* — Padma Mundur
(74) *Attorney, Agent, or Firm* — Keller Jolley Preece

(57) ABSTRACT

A method and apparatus for enabling interoperability of touch devices. The method comprises establishing communication between a master device and one or more slave devices, wherein the master device and the one or more slave devices each comprise a touch screen, and wherein the master device and slave device are each running an application; registering, with the master device, at least one capability for each slave device of the one or more slave devices, communicating a selection made on a slave device of the one or more slave devices to the master device; and implementing the selection from the slave device in the application running on the master device.

20 Claims, 7 Drawing Sheets

METHOD AND APPARATUS FOR ENABLING INTEROPERABILITY OF TOUCH DEVICES

BACKGROUND OF THE INVENTION

1. Field of the Invention

Embodiments of the present invention generally relate to mobile devices, and more particularly, to a method and apparatus for enabling interoperability of touch devices.

2. Description of the Related Art

While working on computing devices, such as personal computers (PCs), laptops, tablets, smartphones and the like, screen size is an important factor that impacts efficiency and convenience of use. In applications such as, graphic design or document editing, a large screen area (i.e., a large workspace) may even be an imperative.

However, there is an increasing popularity in the use of smaller screened computing devices, such as tablets, smartphones, palmtops, and the like. Using applications on the smaller screen devices may be cumbersome due to the small size and, therefore small workspace available. As such, it has become increasingly popular for users to have multiple mobile devices, such as, smartphones, personal digital assistant (PDA), tablets, and the like.

Currently, touch devices are generally not interoperable with respect to touch operation. That is, a user may only work within the screen size provided by the touch device. While multiple screens have been used as attachments to a single computing device, for example, a PC having one or more additional screens, such configurations are cumbersome due to the size of the devices and lack interoperability of multiple applications on multiple screens.

Therefore, there is a need for a method and apparatus for enabling interoperability of touch devices.

SUMMARY OF THE INVENTION

A method and apparatus for enabling interoperability of touch devices substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
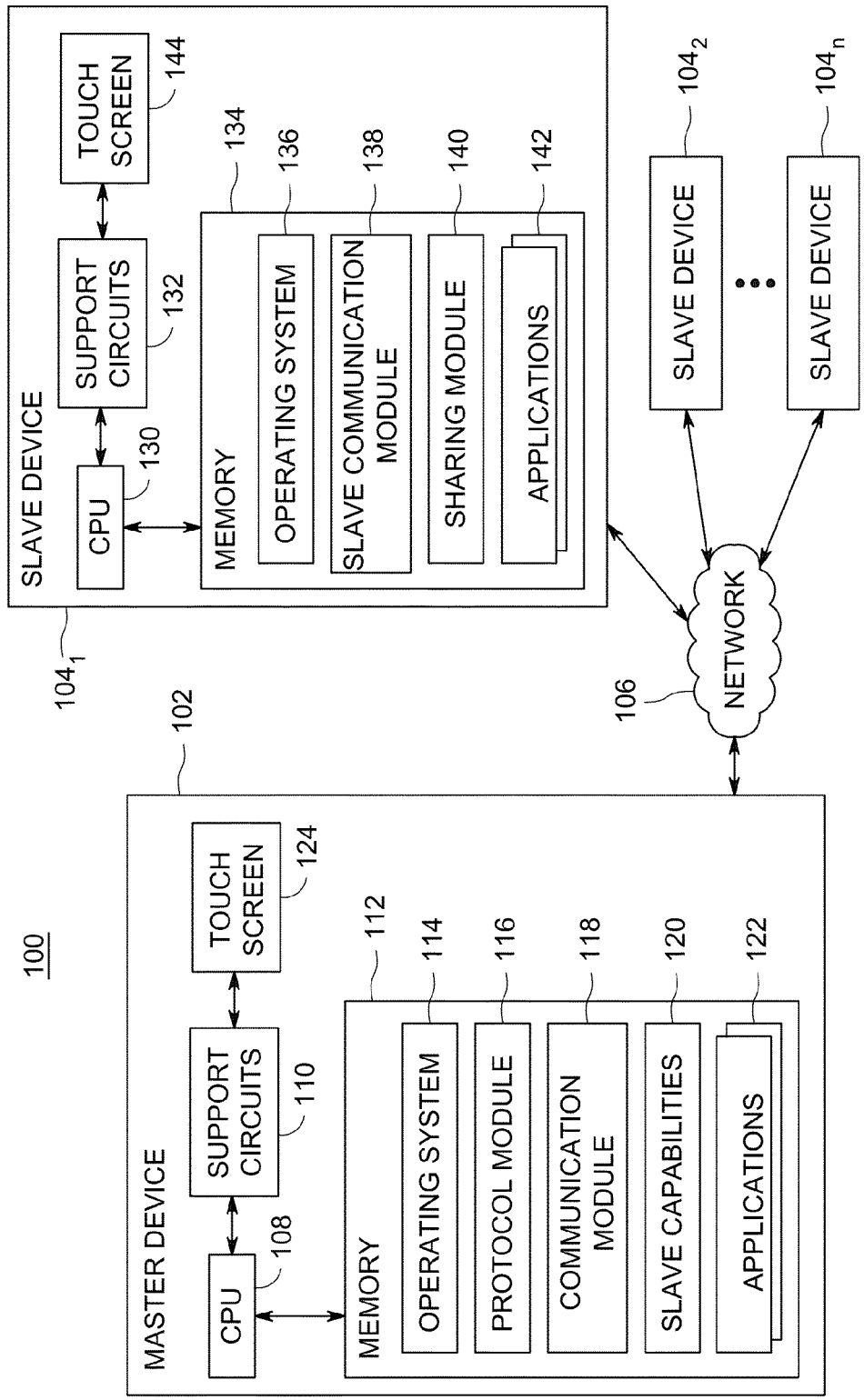
FIG. 1 depicts a block diagram of a system for enabling interoperability of touch devices, according to one or more embodiments of the invention.

While the method and apparatus is described herein by way of example for several embodiments and illustrative drawings, those skilled in the art will recognize that the method and apparatus for enabling interoperability of touch devices are not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for enabling interoperability of touch devices as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for enabling interoperability of touch devices. The method and apparatus enable a user working within a software application on a touch device to simplify the screen of the touch device (i.e., workspace) by placing various toolbars, color palettes, or other selectable options onto the screen of one or more connected touch devices. A master device is linked to the one or more slave devices, such that operations or selections made on the one or more slave devices are reflected on the master device. For example, if a color is selected from a color palette on a slave device, the selected color is applied to the software application running on the master device. If a font is selected from a font selection toolbar on a slave device, the selected font is applied to the software application running on the master device.

A device (referred to a master device) runs a software application and listens for one or more devices (referred to as slave devices) with which to connect. When the one or more slave devices start up, they send a request to connect with the master device. For example, an Apple iPad may run ADOBE® PHOTOSHOP® Touch. An Apple iPhone may run ADOBE® KULER®, and a MOTOROLA® XOOM® may run ADOBE® PHOTOSHOP® TOUCH. The iPad (i.e., the master device) acts as a server and the iPhone and XOOM® (i.e., slave devices) act as clients. As shown in the above example, the master device and slave devices may run the same application or they may run different applications.

When the master device acknowledges each slave device, the slave device will respond to the master with a list of capabilities based on the application running on each of the slave devices. For example, the iPhone running ADOBE® KULER® may be capable of sharing color changes. The XOOM®, running ADOBE® PHOTOSHOP® TOUCH, may be capable of sharing color changes, pen width, eraser width, or eyedropper (a color sampler tool).

In accordance with embodiments of the invention, the iPad master device running ADOBE® PHOTOSHOP® TOUCH display screen comprises only the display area of Photoshop where media content is created and edited. The iPhone slave device display screen comprises the color theme selection tool of ADOBE® KULER®. The XOOM® slave device display screen comprises the ADOBE® PHOTOSHOP® TOUCH toolbar, color palette, and other desired selection tools. While the exemplary embodiments describe using ADOBE® KULER® and ADOBE® PHOTOSHOP® TOUCH, any touch applications capable may be utilized.

Once the devices are connected and the capabilities of the slave devices are registered with the master device, the devices work together. When a selection is made on the slave, for example, a color change, the selection is communicated to the master. The master determines whether other connected slave devices share the capability and if so, the master device preferably communicates the selection to each slave device capable of sharing the capability, although such communication is not required in all embodiments of the invention. The master device applies the selection to the application running on the master device as if the selection were made on the master device itself. For example, a selection of a color on a slave device results in the master using that color selection. The master device continues to use the selection until another selection is received from a slave device. When a user completes using the application the one or more slave devices are disconnected from the master.

Advantageously, embodiments enable mobile devices to work together, thereby enlarging work area. Various selection tools reside on the one or more slave devices, thereby leaving greater portion of the workspace of the master available for work. Further, the embodiments provide a seamless experience to the users while doing creative designs by combining the computing ability of multiple devices.

Various embodiments of an apparatus and method enable extending the working mode for touch devices. In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for enabling interoperability of touch devices, according to one or more embodiments of the invention.

The system 100 comprises a master device 102 and one or more slave devices $104_1, 104_2, 104_3, \ldots, 104_n$ (collectively 104) communicatively coupled to each other through a network 110. The network 110 comprises a communication system that connects computers (or devices) by wire, cable, fiber optic and/or wireless link facilitated by various types of well-known network elements, such as hubs, switches, routers, and the like. The network 110 may be a part of the Intranet using various communications infrastructure, such as Ethernet, Wi-Fi, a personal area network (PAN), a wireless PAN, Bluetooth, Near field communication, and the like.

The master device 102 is a type of computing device (e.g., a Personal Digital Assistant (PDA), a tablet, a Smartphone, and/or the like). The master device 102 comprises a CPU 108, support circuits 110, a memory 112, and a touch screen 124. The memory comprises an operating system 114, a protocol module 116, a communication module 118, a file of slave capabilities 120, and a plurality of applications 122. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, displays, and the like. The memory 112 comprises at least one of Read Only Memory (ROM), Random Access Memory (RAM), disk drive storage, optical storage, removable storage and/or the like.

The operating system 114 generally manages various computer resources (e.g., network resources, file processors, and/or the like). The operating system 114 is configured to execute operations on one or more hardware and/or software modules, such as Network Interface Cards (NICs), hard disks, virtualization layers, firewalls and/or the like. Examples of the operating system 124 may include, but are not limited to, Android®, Symbian®, Apple iOS, BlackBerry®, MeeGo, Windows® Phone, and Bada among others.

In some embodiments, the applications 122 include one or more touch applications capable of running on the master device 102. The applications 122 may include, ADOBE® KULER®, ADOBE® PHOTOSHOP® TOUCH, or any application capable of running on a touch device.

The slave devices 104 are a type of computing device (e.g., a Personal Digital Assistant (PDA) and/or the like). The slave devices 104 comprise a CPU 130, support circuits 132, a memory 134, and a touch screen 144. The memory 134 comprises an operating system 136, a slave communication module 138, a sharing module 140, and a plurality of applications 142. The CPU 130 may comprise one or more commercially available microprocessors or microcontrollers that facilitate data processing and storage. The various support circuits 132 facilitate the operation of the CPU 130 and include one or more clock circuits, power supplies, cache, input/output circuits, displays, and the like. The memory 134 comprises at least one of Read Only Memory (ROM), Random Access Memory (RAM), disk drive storage, optical storage, removable storage and/or the like.

The operating system 136 generally manages various computer resources (e.g., network resources, file processors, and/or the like). The operating system 136 is configured to execute operations on one or more hardware and/or software modules, such as Network Interface Cards (NICs), hard disks, virtualization layers, firewalls and/or the like. Examples of the operating system 136 may include, but are not limited to, Android®, Symbian®, Apple iOS, BlackBerry®, MeeGo, Windows® Phone, and Bada among others.

In some embodiments, the applications 142 may include, but are not limited to, ADOBE® KULER®, ADOBE® PHOTOSHOP® TOUCH, or any application capable of running on a touch device.

According to some embodiments, the communication module 118 links the master device 102 and the one or more slave devices 104. In some embodiments, the communication module 118 on the master device 102 creates a socket and listens for the one or more slave device 104 connections. The communication module 138 on the slave device 104 creates a socket and connects to the master device 102. The communication modules 118, 138 set up a communication connection utilizing, for example, one of the TCP/IP protocol and/or the Bluetooth® protocol, to establish bidirectional communications between the master device 102 and each of the one or more slave devices 104.

The communication module 118 receives a list of capabilities from each of the one or more slave devices 104. Each of the one or more slave devices 104 may be running a different application 142 and may have different capabilities. The capability module 120 stores the identification of the connected slave devices and the capabilities of each connected slave device in a file of slave capabilities 120.

According to some embodiments, the protocol module 116 defines a protocol to enable communication between the master device and the one or more slave devices 104. The protocol module 116 defines how information is shared between the master device 102 and the one or more slave devices 104.

Once communication between a master device 102 and one or more slave devices 104 is established, the devices 102, 104 operate as one. A selection made on a slave device 104, such as a color change, a font change, or any selection made within the application 142, is applied to the application on the master device 102. When a selection is made a slave device 104, the sharing module 140 communicates the selection to the master device 102. The master device 102 accesses a file of slave capabilities 122 in order to determine which one or more slave devices 104 share the selected capability. The master device 102 applies the selected capability to the application workspace on the master device 102 and further sends the selected capability to each of the one or more slave devices 104 that share that selected capability. Selections may be made on the master device 102 or any one or more slave devices 104. The selections are applied to the master device 102 and are shared with the one or more slave devices 104 that are capable of sharing the selected capability. As previously noted, such selection sharing is not required in all embodiments of the invention.

Figure 2:
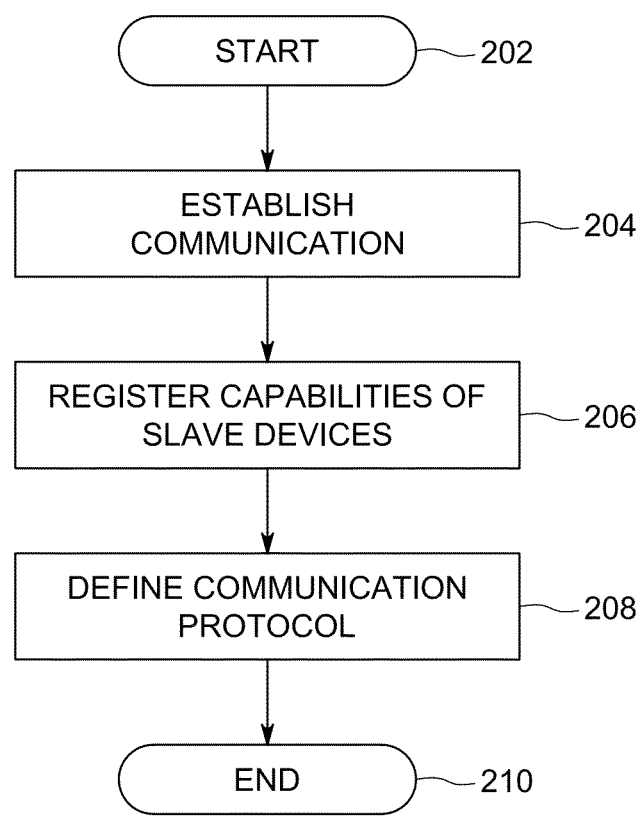
FIG. 2 depicts a flow diagram a method for enabling interoperability of touch devices as performed by a protocol module, a communication module, and a slave communication module of FIG. 1, according to one or more embodiments.

FIG. 2 depicts a flow diagram a method 200 for enabling interoperability of touch devices as performed by the protocol module 116, the communication module 118 and the slave communication module 138 of FIG. 1, according to one or more embodiments. The method 200 establishes a communication link between a master device and one or more slave devices, registers the capabilities of the one or more slave devices, and defines protocol to enable the master device and the one or more slave devices to work together.

The method 200 starts at step 202 and proceeds to step 204. At step 204, the method 200 establishes communication between a host device and one or more slave devices. The method 200 creates a socket on the host device and listens for connections. A socket is an endpoint of a communication flow. The method 200 also creates sockets on the one or more slave devices to connect to the master device, thereby providing a bidirectional connection for the master device with each slave device.

The method 200 proceeds to step 206, where the method 200 registers the capabilities of the slave devices. For example, if a first slave device has an application running, for example, ADOBE® KULER®, which is capable of selecting a color theme, the slave device registers the capability of color change with the master device. If a second slave device is running ADOBE® PHOTOSHOP® TOUCH, which is a multifunctional application with various tools for selecting colors, pen width, eraser types, and the like, then the second slave may register the capabilities of color change, pen change, eyedropper (a color selection tool), and eraser select. These capabilities are stored on the master device in a file of slave capabilities.

The method 200 proceeds to step 208, where the method 200 defines the protocol for communication between the host device and the one or more slave devices. For example, the protocol for the second slave device may be defined as follows:

Subscribe messages: <subscribe;color:pen:colortheme:eraser:thickness>
Set color:<set;color:(r,g,b)>
Set pen: <set;pencil:thickValue>
Set colorTheme: <set;colorTheme:(r,g,b)-(r,g,b)-(r,g,b)-(r,g,b)-(r,b,g)>
Set eraser: <set:eraser>
Set thickness: <set;thickness:thickvalue>

The master device and the one or more slave devices use this protocol to exchange messages. Once communication is established, the capabilities of the slave devices are registered with the master device and the communication protocol is defined, interoperability between the master device and the one or more slave devices is established. The method 200 proceeds to step 210 and ends.

Figure 3:
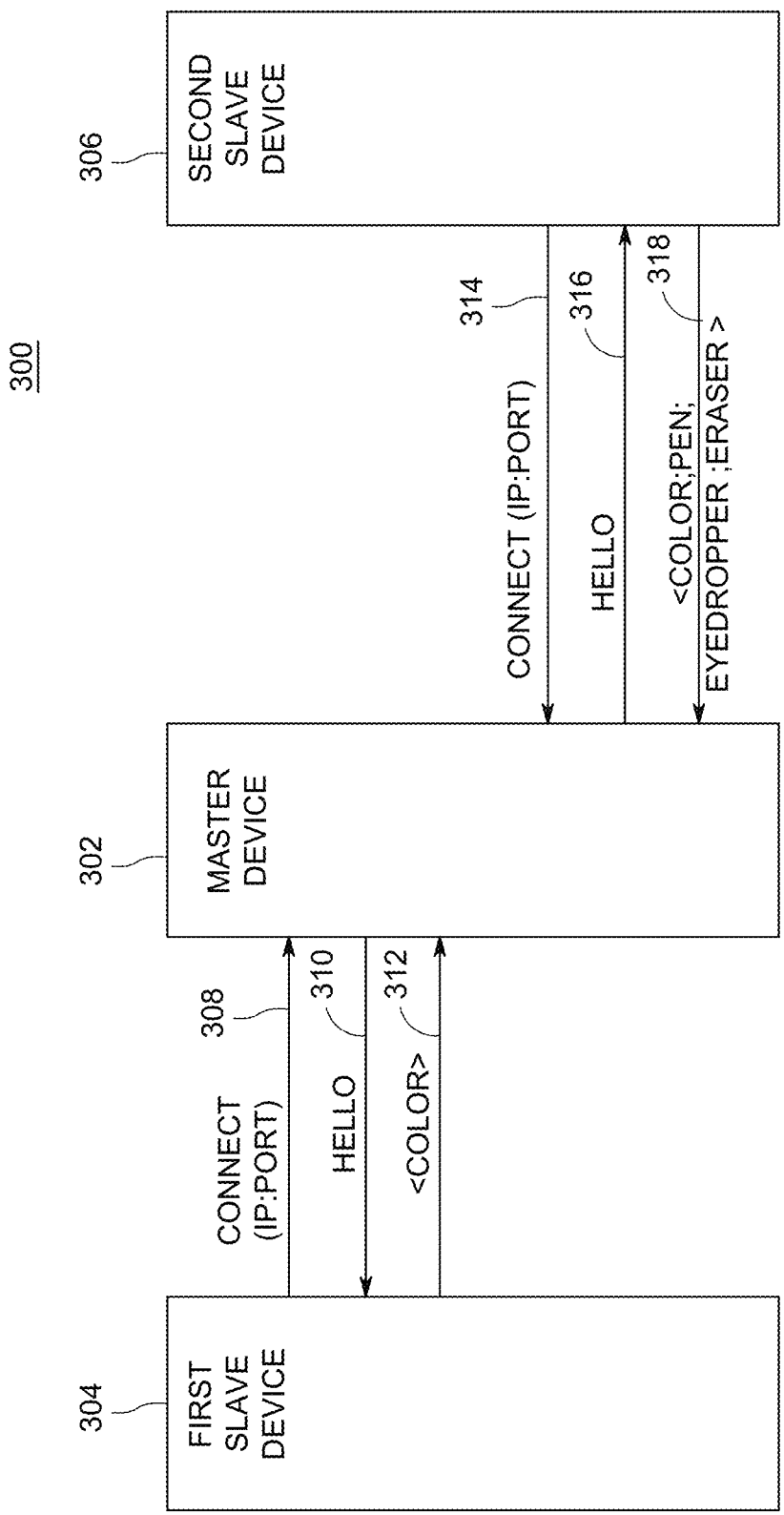
FIG. 3 is a functional block diagram of establishing a connection between a master device to two slave devices using the method FIG. 2, according to one or more embodiments.

FIG. 3 is a functional block diagram of establishing a connection between a master device 302 to two slave devices 304, 306 using the method 200 of FIG. 2, according to one or more embodiments. The master device 302 opens a socket, for example, a TCP/IP socket, and listens for the one or more slave devices 304, 306.

The master device 302 receives a communication request 308 from a first slave device 304. In response, the master device 302 sends an acknowledgment 310 of the communication request to the first slave device. The first slave device 304 responds to the acknowledgment with a list of its capabilities 312. The capabilities are defined by the capabilities of the application currently running on the slave device. In the present example, the first slave device 304 is running the application ADOBE® KULER®, on which color themes may be selected. As such, color is a capability that the first slave device 304 may share.

The master device 302 also receives a communication request 314 from a second slave device 306. In response, the master device 302 sends an acknowledgment 316 of the communication request to the second slave device 306. The second slave device 306 responds to the acknowledgment with a list of its capabilities 318. In this example, the second slave device 306 is running ADOBE® PHOTOSHOP® TOUCH. The second slave device 306 may be capable of selecting a color, pen width, eraser width, and the like.

Figure 4:
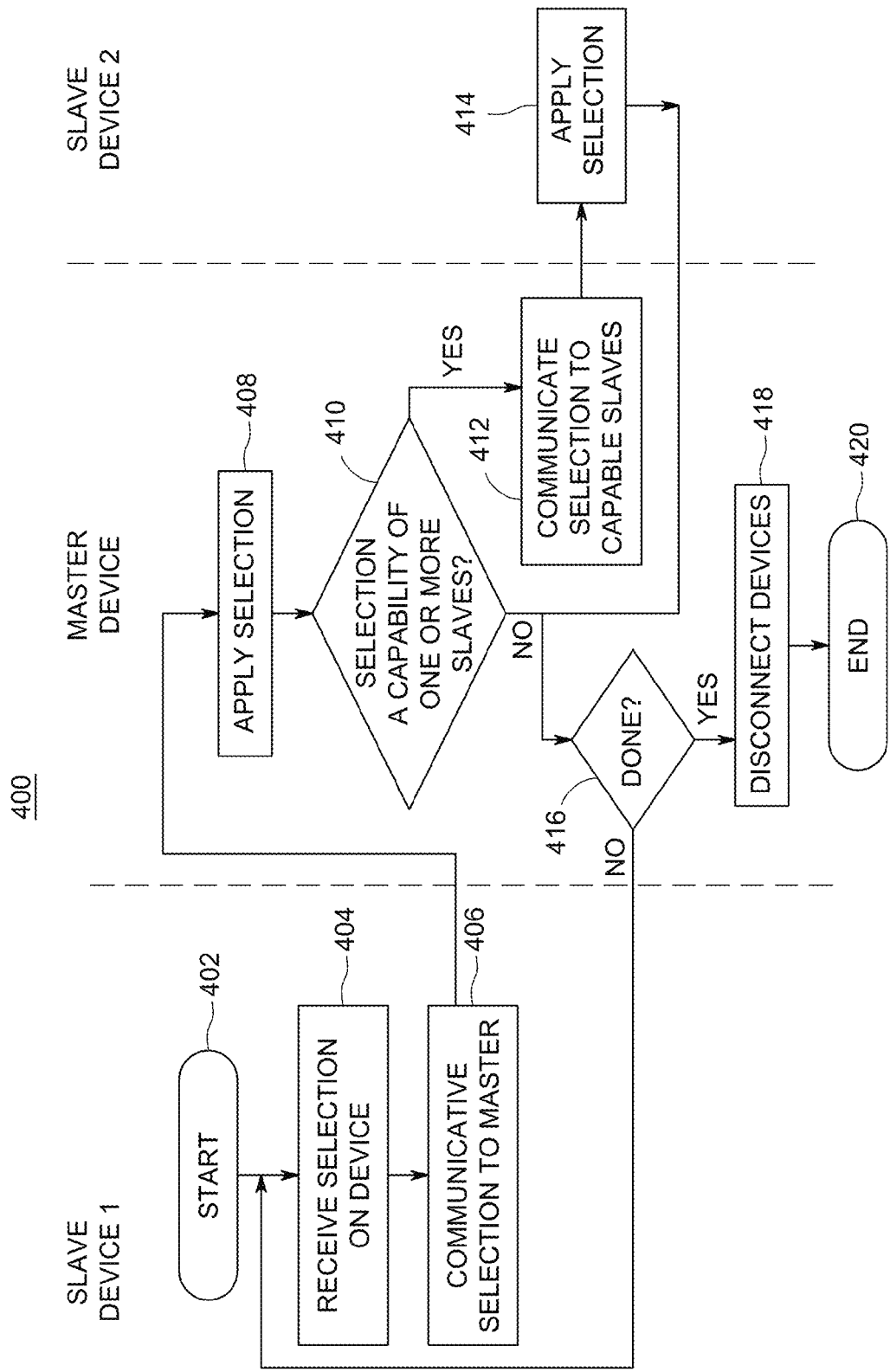
FIG. 4 depicts a flow diagram of a method for performing a workflow among connected inter-operable devices, as performed by the communication module and a sharing module of FIG. 1, according to one or more embodiments.

FIG. 4 depicts a flow diagram of a method 400 for performing a workflow among connected inter-operable devices, as performed by the communication module 118 and the sharing module 140 of FIG. 1, according to one or more embodiments. A master device is linked to one or more slave devices, such that operations or selections made on the one or more slave devices are reflected on the master device. The master device is running a software application, which may or may not be the same software application running on one or more slave devices. The method 400 communicates selections made in the software applications between a master device and one or more slave devices.

The method 400 starts at step 402 and proceeds to step 404. At step 404, the method 400 receives a selection on a first slave device. The selection may be from a toolbar, color palette, or other selectable tool located on the first slave device. The method 400 proceeds to step 406, where the method 400 communicates the selection to a master device. The method 400 communicates the selection using the protocol defined in step 208 of FIG. 2, above. For example, if the selection was a color from a color palette on the first slave device, the method 400 facilitates sending the selected color using the protocol: color:<set;color:(r,g,b)> (with the appropriate color values) to the master device. The method 400 proceeds to step 408, where the method 400 applies the selection received from the slave device to the application running on the master device.

The method 400 proceeds to step 410, where the method 400 determines whether one or more slave devices possess the capability of sharing the selected capability received from the first slave device. The method 400 accesses a file of slave capabilities that was created when the connection between the master device and the one or more slave devices was established and the capabilities of the slave devices were registered. If one or more slave devices (other than the slave device from which the selection was received) possesses the capability of the selected capability, the method 400 proceeds to step 412, where the method 400 communicates the selection to the one or more capable slave devices. The method 400 proceeds to step 414, where the method 400 facilitates applying the selection to the application running on each of the one or more slave devices possessing the selected sharing capability. As previously noted, such selection sharing is not required in all embodiments of the invention. The method 400 proceeds to step 416.

If at step 410, the method 400 determines there are no slave devices possessing the capability of the selected change, the method 400 proceeds to step 416, where the method 400 determines whether selections on the master or the one or more slaves is complete. If the method 400 determines that additional selections are made on the devices, the method 400 proceeds to step 404 and iterates until all selections are complete. When all selections are complete, the method 400 proceeds to step 418, where the master device is disconnected from the one or more slave devices, communication between the devices is broken, and thereafter the master device and the one or more slave devices work independently from one another. The method 400 proceeds to step 420 and ends.

Figure 5:
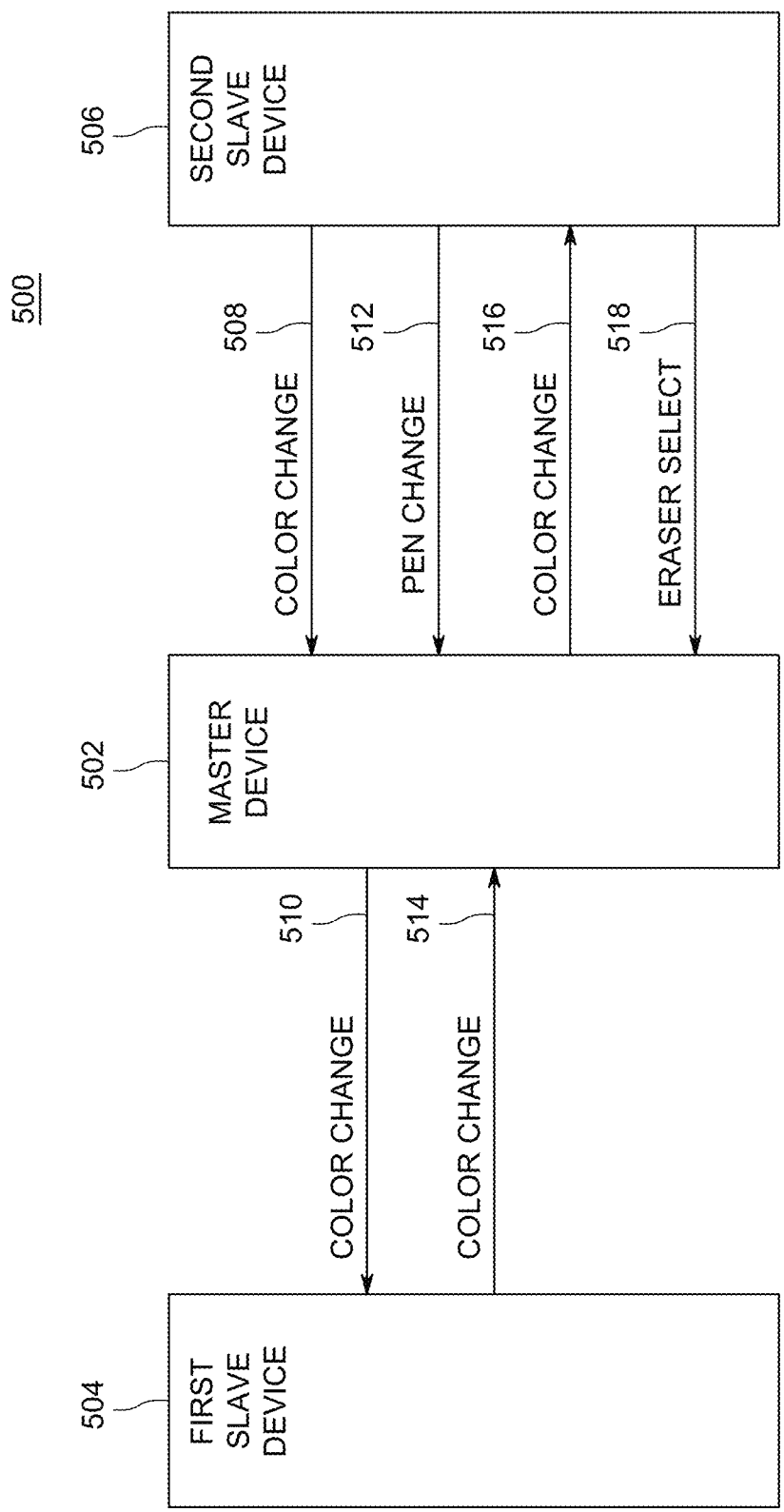
FIG. 5 is a functional block diagram of interoperability between a master device and two slave devices, using the method of FIG. 4, according to one or more embodiments of the invention.

FIG. 5 is a functional block diagram of interoperability between a master device 502 and two slave devices 504, 506, using the method 400 of FIG. 4, according to one or more embodiments of the invention. Prior to the execution of method 500, communication between the master device 502 and the first slave device 504 and the second slave device 506 has been established and the capabilities of the slave devices 504, 506 have been communicated to the master device 502 and stored in a file of slave capabilities. In this exemplary embodiment, the first slave device 504 is capable of color change only. The second slave device 506 is capable of color change, pen change, and eraser change. Selections made on a slave device 504, 506 are communicated to the master device 502 and applied to the application running on the master device 502.

The master device 502 receives a communication of a color change 508 from the second slave device 506. The selected color change is sent to the master device 502 using the protocol as defined at step 208 of FIG. 2 above. The master device 502 implements the selected color change in an application running on the master device 502. For example, if the master device is currently running ADOBE® PHOTOSHOP® TOUCH, the color selected on the second slave device 506 is implemented on the master device 502 and any actions performed on the workspace of the master device 506 reflect the color change made on second slave device 506.

The master device 502 accesses the file of slave capabilities and determines that the first slave device 504 is capable of sharing color change and send a communication 510 to the first slave device 504. The first slave device 504 receives the communication 510 and the color change is then reflected on the first slave device 504. For example, if the first slave device is running ADOBE® KULER® and the second slave device 506 is running ADOBE® PHOTOSHOP® TOUCH, the color selected from an ADOBE® PHOTOSHOP® TOUCH color palette on the second slave device 506 and communicated to the master device 502, is further communicated to the first slave device 504, where the color change is reflected in the ADOBE® KULER® application running on the first slave device 504.

The master device 502 receives a communication of a pen change 512 from the second slave device 506. The selected pen change is sent to the master device 502 using the protocol as defined at step 208 of FIG. 2 above. The master device 502 implements the selected pen change in an application running on the master device 502. The master device 502 accesses the file of slave capabilities and determines that no other slave devices are capable of sharing pen change. As such, no further communication between devices occurs regarding pen change.

The master device 502 receives a communication of a color change 514 from the first slave device 504. The selected color change is sent to the master device 502 using the protocol as defined at step 208 of FIG. 2 above. As describe above, the master device 502 implements the selected color change in the application running on the master device 502.

The master device 502 accesses the file of slave capabilities and determines that the second slave device 506 is capable of sharing color change and send a communication 516 to the second slave device 506. The second slave device 506 receives the communication 516 and the color change is then reflected on the second slave device 506.

The master device 502 receives a communication of an eraser selection 518 from the second slave device 506. The selected eraser selection is sent to the master device 502 using the protocol as defined at step 208 of FIG. 2 above. The master device 502 implements the selected eraser selection in an application running on the master device 502. The master device 502 accesses the file of slave capabilities and determines that no other slave devices are capable of sharing eraser selection. As such, no further communication between devices occurs regarding eraser selection.

FIGS. 6A-6E collectively depict an exemplary embodiment 600 illustrating sharing capabilities between a master device 602 and two slave devices 604, 606, according to one or more embodiments of the invention.

Figure 6A:
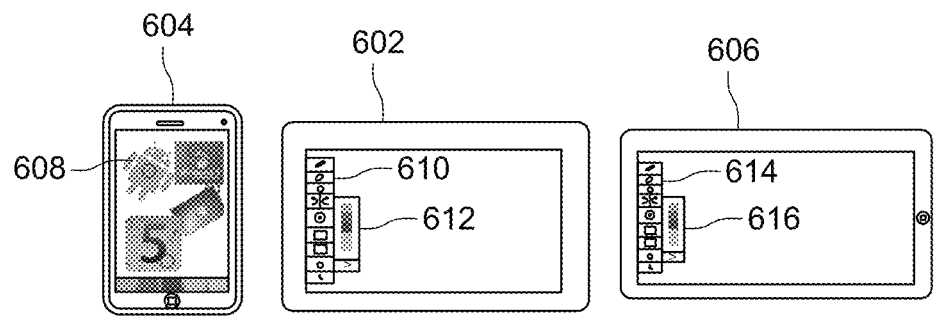
FIGS. 6A-6E collectively depict an exemplary embodiment illustrating sharing capabilities between a master device and two slave devices, according to one or more embodiments of the invention.

FIG. 6A illustrates a master device 602 and two slave devices 604 and 606 operating independently. In this mode, each device runs its individual application. In the exemplary embodiment, the master device 602 is running ADOBE®PHOTOSHOP® TOUCH. Slave device 604 is running ADOBE® KULER®, a touch application that enables a user to generate and view color themes. Various images 608 that define a color theme are displayed on the slave device 604. Master device 602 is running ADOBE® PHOTOSHOP® TOUCH, a touch application that enables a user to create images. An ADOBE® PHOTOSHOP® TOUCH toolbar 610 and color palette 612 are displayed on the master device 602. Slave device 606 is also running ADOBE® PHOTOSHOP® TOUCH. Similarly, a PHOTOSHOP® TOUCH toolbar 614 and color palette 616 are displayed on the slave device 606. The applications running on the devices cover a portion of the workspace on each device.

Figure 6B:
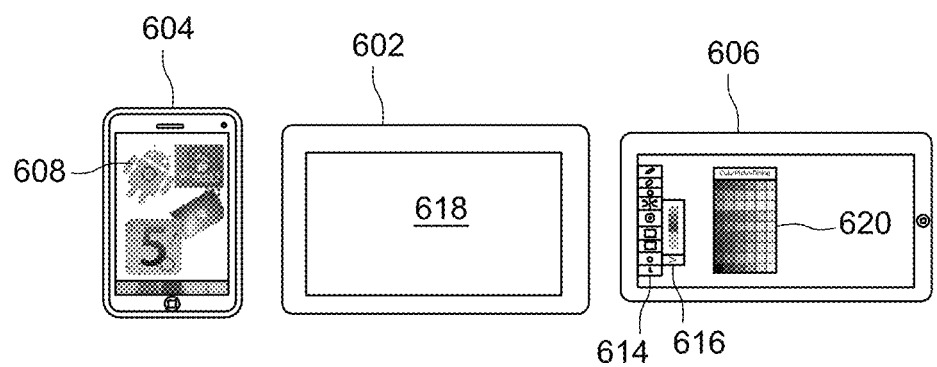

FIG. 6B depicts illustrates a master device 602, inter-operably connected to the slave devices 604, 606. The embodiments establish connections between devices, and the slave devices 604, 606 register capabilities with the master device 602. After the connection is established between the devices, the workspace 618 on the master device 602 is clear of toolbar 610 and color palette 612 shown in FIG. 6A and the ADOBE® PHOTOSHOP® TOUCH toolbar 614 and color palette 616 are displayed on the slave device 606. In addition, because workspace is available, an expanded color palette 620 is visible on the slave device 606. The color theme 608 remains visible on the slave device 604.

Figure 6C:
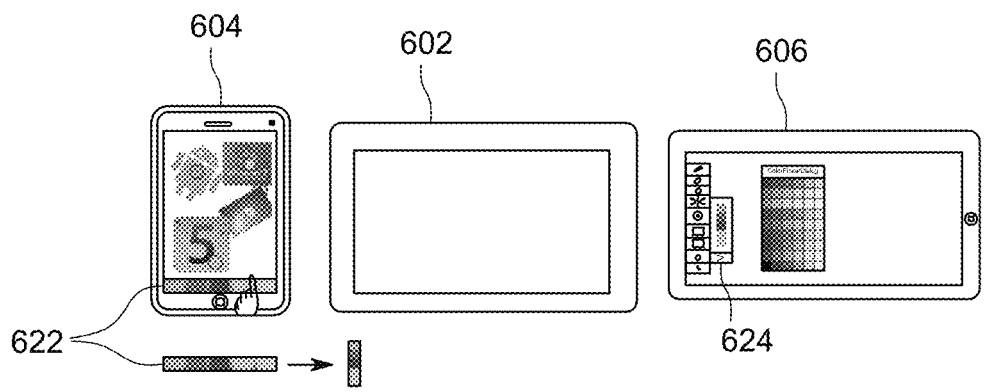

FIG. 6C illustrates communicating a color theme selected on the slave device 604 to the master device 602 and further to the slave device 606. As illustrated, a color theme 622 is selected on the slave device 604 via the ADOBE® KULER® application. The selected color theme 622 is communicated to the master device 602. The master device 602 determines that the slave device 606 possesses color changing capabilities and communicates the color change (i.e., the selected color theme) to the slave device 606. The slave device 606 implements the color change on the slave device 606 in the ADOBE® PHOTOSHOP® TOUCH color palette 624.

Figure 6D:
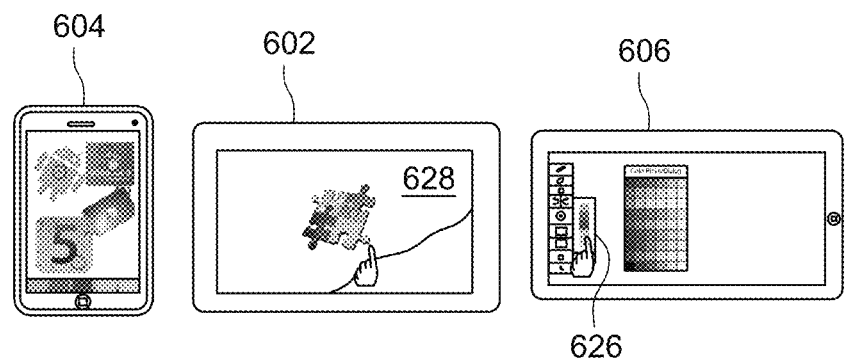

FIG. 6D illustrates utilizing the selected color theme on the master device 602. A color 626 is selected on the slave device 606. The selected color is communicated to the master device 602, so when a user of the master device 602 draws in the workspace 628, the selected color 626 is applied in the workspace 628.

Figure 6E:
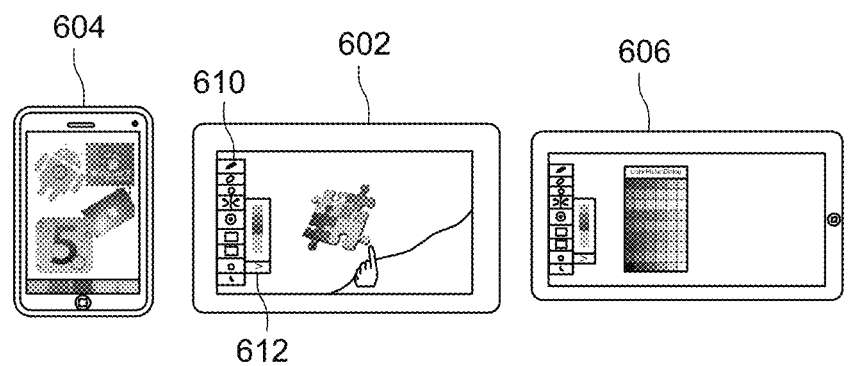

FIG. 6E illustrates the master device 602 and the slave devices 604, 606 after the connection between the master device 602 and the slave devices 604, 606 is broken. The slave devices 604, 606 remain unchanged, and the master device 602 now displays the ADOBE® PHOTOSHOP® TOUCH toolbar 610 and color palette 612. The devices 602, 604, and 606 operate independently. If, for example, a color were selected on a slave device 604, 606, that selected color would not be applied to the master device 602.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method of enabling interoperability of touch devices comprising:
 establishing communication between a master mobile device and one or more slave mobile devices, wherein the master mobile device and the one or more slave mobile devices each comprise a touch screen, and wherein the master mobile device and the one or more slave mobile devices are each running an application;
 registering, with the master mobile device, at least one capability for each slave mobile device of the one or more slave mobile devices;
 displaying on the touch screen of the master mobile device a plurality of selectable options of the application running on the master mobile device;
 enabling inter-operability of the application across the master mobile device and the one or more slave mobile devices by:
 increasing a screen workspace of the application running on the master mobile device by clearing the touch screen of the master mobile device of the plurality of selectable options of the application running on the master mobile device;
 in response to the clearing the touch screen of the master mobile device, placing the plurality of selectable options cleared from the touch screen of the master mobile device onto at least one touch screen of the one or more slave mobile devices;
 communicating a selection of one of the selectable options of the plurality of selectable options made on the at least one touch screen of the one or more slave mobile devices to the master mobile device; and
 implementing the communicated selection from the one or more slave mobile devices in the application running on the master mobile device.

2. The method of claim 1, wherein establishing communication comprises:
 opening a communication socket;
 listening, on the master mobile device, for the one or more slave mobile devices;
 receiving a communication request from at least one slave mobile device of the one or more slave mobile devices;
 connecting the master mobile device to the at least one slave mobile device; and
 defining a protocol for communicating the selection.

3. The method of claim 1, wherein the plurality of selectable options are in the form of a tool bar, menu bar, or status bar.

4. The method of claim 1, wherein registering comprises defining selection capabilities based on the application running on the one or more slave mobile devices, wherein the selection capabilities are selectable options shared with the application running on the master mobile device.

5. The method of claim 1, wherein the application running on the master mobile device is a different version from a version of the application running on the one or more slave mobile devices.

6. The method of claim 1, wherein communicating a selection to the master mobile device further comprises communicating the selection to one or more slave mobile devices possessing a capability of sharing the selection.

7. The method of claim 1, wherein the master mobile device and the one or more slave mobile devices are tablets or smartphones.

8. A touch screen device comprising:
 a touch screen;
 at least one processor; and
 a non-transitory computer readable storage medium comprising instructions, which when executed by the at least one processor, cause the touch screen device to:
 establish communication with one or more slave mobile devices running an application that is also running on the touch screen device;
 register at least one capability for each slave mobile device of the one or more slave mobile devices;
 display on the touch screen of the touch screen device a plurality of selectable options of the application running on the touch screen device; and
 enable inter-operability of the application across the touch screen device and the one or more slave mobile devices by:
 increasing a screen workspace of the application running on the touch screen device by clearing the touch screen of the touch screen device of the plurality of selectable options of the application;
 in response to the clearing the touch screen of the touch screen device, communicating the plurality of selectable options cleared from the touch screen of the touch screen device to the one or more slave mobile devices;
 receiving a communication defining a selection of one of the plurality of selectable options cleared from the touch screen of the touch screen device made on a touch screen of the one or more slave mobile devices; and
 implementing the selection from the one or more slave mobile devices in the application running on the touch screen device.

9. The touch screen device of claim 8, wherein the instructions, when executed by the at least one processor, cause the touch screen device to establish communication by:
 opening a communication socket;
 listening, on the touch screen device, for the one or more slave mobile devices;
 receiving a communication request from at least one slave mobile device;
 connecting the touch screen device to the at least one slave mobile device; and
 defining a protocol for communicating the selection.

10. The touch screen device of claim 8, wherein the plurality of selectable options are in the form of a tool bar, menu bar, or status bar.

11. The touch screen device of claim 8, wherein the instructions, when executed by the at least one processor, cause the touch screen device to register at least one capability for each slave mobile device of the one or more slave mobile devices by: defining selection capabilities based on the application running on at least one slave mobile device, wherein the selection capabilities are selectable options shared with the application running on the touch screen device.

12. The touch screen device of claim 8, wherein a version of the application running on the touch screen device is different from a version of the application running on the one or more slave mobile devices.

13. The touch screen device of claim 8, wherein the instructions, when executed by the at least one processor, cause the touch screen device to implement the selection from the one or more slave mobile devices in the application running on the touch screen device in response to receipt of the communication defining the selection made on the touch screen of the one or more slave mobile devices without the selection being made on the touch screen device of the touch screen device.

14. A non-transitory computer readable medium for storing computer instructions that, when executed by at least one processor, causes the at least one processor to perform a method for enabling interoperability of touch devices comprising:
   establishing communication between a master mobile device and one or more slave mobile devices, wherein the master mobile device and the one or more slave mobile devices each comprise a touch screen, and wherein the master mobile device and the one or more slave mobile devices are each running an application;
   registering, with the master mobile device, at least one capability for each slave mobile device of the one or more slave mobile devices;
   displaying on the touch screen of the master mobile device a plurality of selectable options of the application running on the master mobile device;
   enabling inter-operability of the application across the master mobile device and the one or more slave mobile devices by:
      increasing a screen workspace of the application running on the master mobile device by clearing the touch screen of the master mobile device of the plurality of selectable options of the application running on the master mobile device; and
      in response to the clearing the touch screen of the master mobile device, placing the plurality of selectable options cleared from the touch screen of the master mobile device onto at least one touch screen of the one or more slave mobile devices;
   communicating a selection of one of the selectable options of the plurality of selectable options made on the at least one touch screen of the one or more slave mobile devices to the master mobile device; and
   implementing the communicated selection from the one or more slave mobile devices in the application running on the master mobile device.

15. The computer readable medium of claim 14, wherein establishing communication comprises:
   opening a communication socket;
   listening, on the master mobile device, for the one or more slave mobile devices;
   receiving a communication request from at least one slave mobile device;
   connecting the master mobile device to the at least one slave mobile device; and
   defining a protocol for communicating the selection.

16. The computer readable medium of claim 14, wherein the plurality of selectable options are in the form of a tool bar, menu bar, or status bar.

17. The computer readable medium of claim 14, wherein the instructions, when executed by the at least one processor, cause the at least one processor to perform registering by: defining selection capabilities based on the application running on at least one slave mobile device, wherein the selection capabilities are selectable options shared with the application running on the master mobile device.

18. The computer readable medium of claim 14, wherein, the application running on the master mobile device is a different version from a version of the application running on the one or more slave mobile devices.

19. The computer readable medium of claim 14, wherein the instructions, when executed by the at least one processor, cause the at least one processor to perform communicating a selection to the master mobile device by communicating the selection to one or more slave mobile devices possessing the capability of sharing the selection.

20. The computer readable medium of claim 14, wherein the master mobile device and the one or more slave mobile devices are tablets or smartphones.

* * * * *